(12) United States Patent
Senda et al.

(10) Patent No.: US 8,302,575 B2
(45) Date of Patent: Nov. 6, 2012

(54) SYSTEM FOR RESTARTING INTERNAL COMBUSTION ENGINE WHEN ENGINE RESTART CONDITION IS MET

(75) Inventors: Takashi Senda, Niwa-gun (JP); Kenji Kawahara, Kariya (JP)

(73) Assignee: Denso Corporation, Kariya (JP)

( * ) Notice: Subject to any disclaimer, the term of this patent is extended or adjusted under 35 U.S.C. 154(b) by 469 days.

(21) Appl. No.: 12/723,142

(22) Filed: Mar. 12, 2010

(65) Prior Publication Data

US 2010/0229815 A1    Sep. 16, 2010

(30) Foreign Application Priority Data

Mar. 12, 2009  (JP) ................................ 2009-059141

(51) Int. Cl.
*F02D 29/02* (2006.01)
*F02D 43/04* (2006.01)

(52) U.S. Cl. .................................... 123/179.4; 701/112
(58) Field of Classification Search ............... 123/179.3, 123/179.4; 701/112, 113
See application file for complete search history.

(56) References Cited

U.S. PATENT DOCUMENTS

| 6,702,718 | B2 | | 3/2004 | Tani et al. | |
|---|---|---|---|---|---|
| 7,465,250 | B2 | * | 12/2008 | Tamai et al. | 477/3 |
| 7,501,791 | B2 | * | 3/2009 | Thimm et al. | 903/906 |
| 7,734,403 | B2 | * | 6/2010 | Baijens et al. | 701/70 |

FOREIGN PATENT DOCUMENTS

| JP | A-11-257118 | 9/1999 |
|---|---|---|
| JP | A 2000-205000 | 7/2000 |
| JP | A-2002-221059 | 8/2002 |
| JP | A 2003-035175 | 2/2003 |
| JP | A 2006-152865 | 6/2006 |
| JP | A 2006-170128 | 6/2006 |
| JP | A 2006-283559 | 10/2006 |

* cited by examiner

*Primary Examiner* — Stephen K Cronin
*Assistant Examiner* — Arnold Castro
(74) *Attorney, Agent, or Firm* — Oliff & Berridge, PLC

(57) ABSTRACT

In a system installed in a vehicle, an automatic stop of an engine is carried out when an engine automatic stop condition is met during the vehicle being decelerated. The automatically stopped engine is restarted when an engine restart condition is met before the vehicle is stopped. A vehicle speed obtaining unit obtains a vehicle speed, and a threshold determining unit determines a threshold based on a predetermined-timing value of the vehicle speed. The predetermined-timing value is obtained at a predetermined timing when or after the engine restart condition is met. The threshold is used to determine whether to enable a next automatic stop of the engine. A stop enabling unit enables the next automatic stop of the engine when the speed of the vehicle obtained after the engine restart condition is met is equal to or higher than the threshold.

8 Claims, 6 Drawing Sheets

SYSTEM FOR RESTARTING INTERNAL COMBUSTION ENGINE WHEN ENGINE RESTART CONDITION IS MET

CROSS REFERENCE TO RELATED APPLICATIONS

This application is based on Japanese Patent Application 2009-059141 filed on Mar. 12, 2009. This application claims the benefit of priority from the Japanese Patent Applications, so that the descriptions of which are all incorporated herein by reference.

FIELD OF THE INVENTION

The present invention relates to systems for restarting, when at least one of predetermined engine restart conditions is met, internal combustion engines after they have been automatically stopped.

BACKGROUND OF THE INVENTION

Engine control systems having an engine automatic stop-and-restart function, in other words, an idle reduction function, are known. The engine automatic stop-and-restart function is designed to, in response to a driver's engine stop operation, such as an operation of a brake pedal, stop the burning of air-fuel mixture in each cylinder so as to automatically stop the internal combustion engine. After the stop of the internal combustion engine, the engine automatic stop-and-restart function is designed to cause, in response to a driver's operation to restart the vehicle, such as an operation of an accelerator pedal, a starter to crank the internal combustion engine and thereafter to start the supply of fuel to the internal combustion engine, thus restarting the internal combustion engine.

Various types of techniques are provided for the idle reduction function. For example, the first technique disclosed in, for example, Japanese Patent Application Publication, referred to as "first publication", is designed to, after the internal combustion engine (referred to simply as "engine") has been automatically restarted, disable to carry out the next automatic stop of the engine until the vehicle speed is equal to or higher than a preset speed (for example, 15 km/h).

This first technique restricts frequent repetitions of the automatic stop and restart of the engine while, for example, the vehicle is running at a low speed due to traffic jam and the like.

In addition, the second technique disclosed in, for example, U.S. Pat. No. 6,702,718, referred to as "second publication", corresponding to Japanese Patent Application Publication NO. 2002-221059 is designed to carry out the idle reduction function during the vehicle being decelerated.

Specifically, the second technique is designed to determine that at least one of predetermined engine automatic stop conditions is met when the vehicle speed is reduced with reduction in the rotational speed of the engine due to cut off the supply of fuel to the engine, and to automatically stop the engine in response to the determination. This second technique reduces the opportunities to operate the engine in idle, thus reducing fuel consumption.

During the engine being automatically stopped, when the accelerator pedal is operated so that the vehicle is accelerated, the second technique determines that at least one of predetermined engine restart conditions is met. Thus, the second technique causes the starter to crank the engine and thereafter to start the supply of fuel to the engine, thus restarting the engine.

SUMMARY OF THE INVENTION

The inventors have discovered that there is one problem in a combination of the first and second techniques disclosed in the first and second publications.

Specifically, let us consider that, in a vehicle designed to carry out the idle reduction function during the vehicle being decelerated as the second technique disclosed in the second publication, the first technique disclosed in the first publication is carried out. In this case, during the engine being decelerated by a driver's operation of the brake petal, when the vehicle is slightly accelerated by a driver's operation of the accelerator pedal, it is determined that at least one of the predetermined engine restart condition is met so that the engine is restarted.

Because the restart of the engine causes the vehicle speed to easily reach the preset speed, the automatic stop of the engine is enabled. That is, after the automatic restart of the engine, when the driver's operations of the brake pedal and accelerator pedal are alternately operated repeatedly, the automatic stop and restart of the engine may be repeatedly carried out.

In view of the circumstances set force above, the present invention seeks to provide systems for restarting an internal combustion engine installed in a vehicle; these systems are designed to solve such a problem set forth above.

Specifically, the present invention aims at providing systems for restarting an internal combustion engine; these systems are designed to restrict repetitions of automatic stop and restart of the internal combustion engine even if the idle reduction function is carried out during the vehicle being decelerated.

According to one aspect of the present invention, there is provided a system installed in a vehicle having an internal combustion engine. The system is configured to carry out an automatic stop of the internal combustion engine when at least one engine automatic stop condition is met during the vehicle being decelerated. The system is configured to restart the automatically stopped internal combustion engine when at least one engine restart condition is met before the vehicle is stopped. The system includes a vehicle speed obtaining unit that obtains a speed of the vehicle, and a threshold determining unit that determines a threshold based on a predetermined-timing value of the speed of the vehicle. The predetermined-timing value of the speed of the vehicle is obtained by the vehicle speed obtaining unit at a predetermined timing when or after the at least one engine restart condition is met. The threshold is used to determine whether to enable a next automatic stop of the internal combustion engine. The system includes a stop enabling unit that enables the next automatic stop of the internal combustion engine when the speed of the vehicle obtained after the at least one engine restart condition is met is equal to or higher than the threshold.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Figure 1:
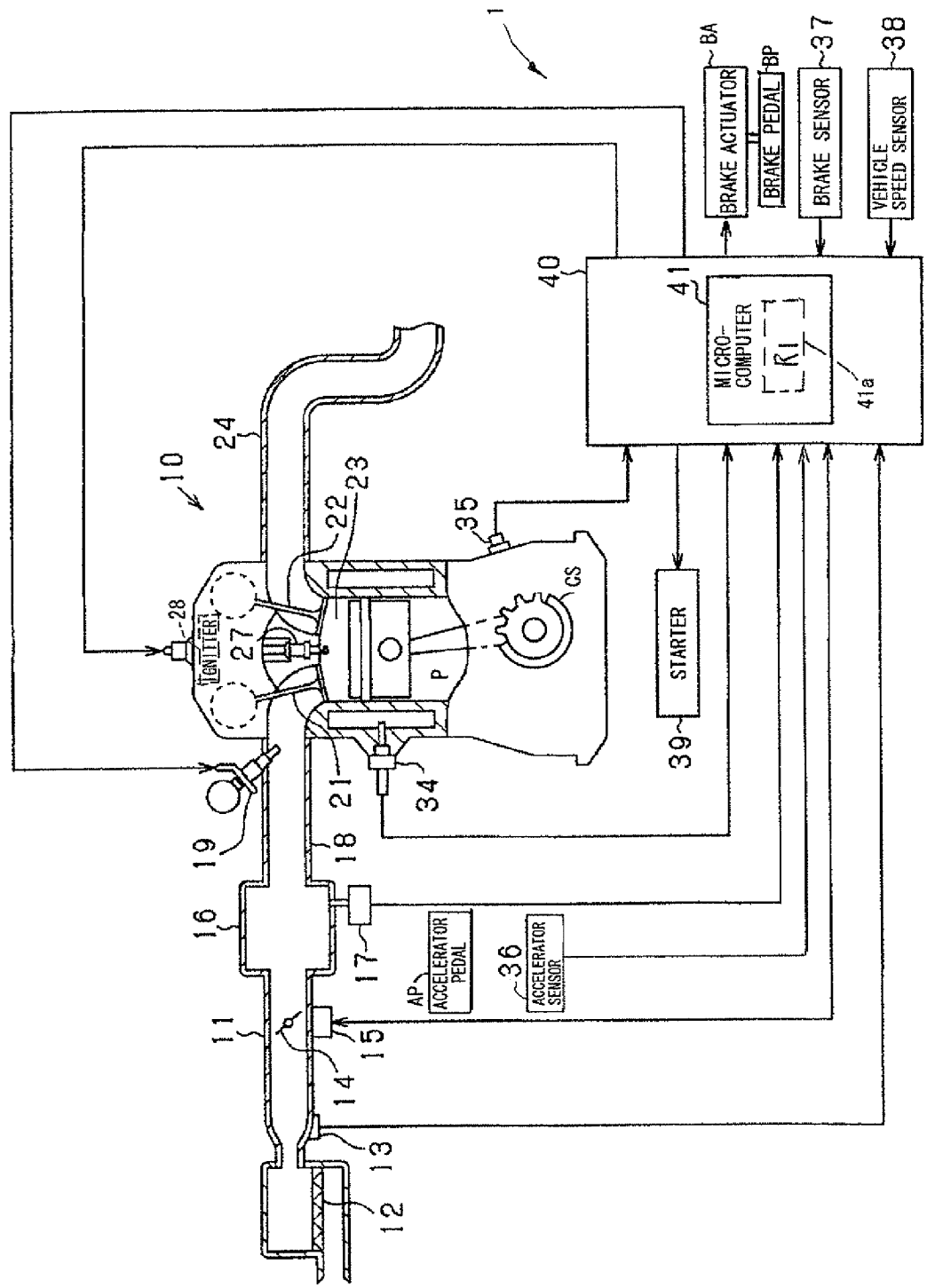
FIG. 1 is a schematic configuration diagram of an engine control system and an internal combustion engine according to the first embodiment of the present invention.

Embodiments of the present invention will be described hereinafter with reference to the accompanying drawings. In the drawings, identical reference characters are utilized to identify identical corresponding components.

First Embodiment

The first embodiment constructed by embodying one aspect of the present invention will be described hereinafter with reference to FIGS. 1 to 4. The first embodiment provides an engine control system 1 for a multiple cylinder gasoline engine, referred to simply as "engine", 10. The engine control system 1 includes an electronic control unit (ECU) 40 as the nerve center thereof and carries out control of the amount of fuel to be injected to each cylinder, control of ignition timing, idle reduction control, and the like. An example of the schematic overall structure of the engine control system 1 and an example of the schematic structure of the engine 10 are illustrated in FIG. 1.

The engine 10 includes an intake pipe 11, an air cleaner 13, a throttle valve 14, a throttle actuator 15, a serge tank 16, an intake manifold pressure sensor 17, an intake manifold 18, a fuel injector 19 for each cylinder, an intake valve 21 for each cylinder, an exhaust valve 22 for each cylinder, a combustion chamber 23 for each cylinder, an exhaust pipe 24, a spark plug 27 for each cylinder, and an igniter 28.

The plurality of cylinders are integrated with each other to form a cylinder block. The head (cylinder head) of the cylinder block, which seals each cylinder, is formed with an intake port 12 and an exhaust port 14.

The intake port 12 serves as a passage in the cylinder head of each cylinder through which an air-fuel mixture allowed to flow from the intake manifold 18 of the engine 10. The intake manifold 18 is coupled to the extreme downstream end of the intake pipe 11 through which air is supplied.

At the extreme upstream end of the intake pipe (intake-air passage) 11, the air cleaner 12 is mounted for trapping dust and dirt from air supplied into the intake pipe 11. The airflow meter 13 is provided in the intake pipe 11 at the downstream of the air cleaner 12. The airflow meter 13 is operative to measure the flow of air through the intake pipe 11.

The throttle valve 14 is mounted in the intake pipe 11 at the downstream of the airflow meter 13 and linked to the throttle actuator 15 integrated with, for example, a DC motor. The throttle actuator 15 is communicably connected to the ECU 40, and linked to a driver-operable accelerator pedal AP.

Under control of the ECU 40, the throttle valve 14 is operative to vary the amount of air entering the intake manifold 18. For example, the throttle valve 18 consists of a flat round disc mounted on a shaft that can be tilted at various angles by the throttle actuator 15. The position (stroke) of the throttle valve 18 is measured by a throttle position sensor 15a installed in the throttle actuator 15. The throttle position sensor 15a is electrically connected to the ECU 40. For example, when the throttle valve 14 is tilted at a fully close position corresponding to an idle mode of the engine 10, the throttle position sensor 15a outputs the measured position of the throttle valve 14 to the ECU 40.

According to the position or stroke of the accelerator pedal AP measured by the throttle position sensor 15a, the throttle actuator 15 causes the throttle valve 14 to set to a target position (angular position) under control of the ECU 40 to thereby vary the amount of air entering the intake manifold 18.

The serge tank 16 is mounted at the downstream of the throttle valve 14 and operative to increase the volume of air in the intake manifold 18. The intake manifold pressure sensor 17 is provided to communicate with the serge tank 16 and electrically connected to the ECU 40. The intake manifold pressure sensor 17 is operative to measure the pressure in the intake manifold 18 and to output, to the ECU 40, data indicative of the measured pressure in the intake manifold 18.

The intake manifold 18 is operative to introduce air into each cylinder through the intake port 12 therefor.

The intake valve 21 serves as, for example, a camshaft-driven valve installed in the cylinder head of each cylinder that opens to allow the air-fuel mixture from the intake port 12 to enter into the cylinder therethrough and closes to form part of the combustion chamber during the compression and power strokes of a predetermined engine operation cycle, for example, four-stroke cycle. The intake valve 21 is electrically connected to the ECU 40, and the opening timing and closing timing of the intake valve 21 for each cylinder are adjusted under control of the ECU 40.

The exhaust port 14 serves as a passage in the cylinder head of each cylinder through which gases pass to the exhaust pipe of the engine 10.

The exhaust valve 22 serves as, for example, a camshaft-driven valve installed in the cylinder head of each cylinder that opens to allow burned exhaust gases to escape out of the cylinder and closes to form part of the combustion chamber during the compression and power strokes of the predetermined engine operation cycle. The exhaust valve 22 is electrically connected to the ECU 40, and the opening timing and closing timing of the exhaust valve 22 for each cylinder are adjusted under control of the ECU 40.

The injector 19 is designed as, for example, an electromagnetically actuated injector installed in the cylinder head of each cylinder to be inserted in close to the intake port 12 thereof. The injector 19 is communicably connected to the ECU 40 and configured to spray fuel into a corresponding cylinder via its intake port 12 under control of the ECU 40.

The spark plug 27 has two electrodes with a gap therebetween. The spark plug 27 is installed in the cylinder head of each cylinder to be inserted in the combustion chamber of each cylinder. The igniter 28 is communicably connected to the ECU 40 and operative to apply a high-level voltage to the spark plug 27 of a corresponding cylinder at a desired timing for the corresponding cylinder under control of the ECU 40.

The high-level voltage applied to the spark plug 27 for a corresponding cylinder causes high-tension voltage jumps across the gap to create a spark. The spark ignites the air-fuel mixture in the combustion chamber 23 of a corresponding cylinder so as to burn the air-fuel mixture in the corresponding cylinder.

Specifically, the engine 10 works to compress air-fuel mixture or air by a moving piston P within each cylinder, and burn the compressed air-fuel mixture within each cylinder to change the fuel energy to mechanical energy (power), thus rotating a crankshaft CS. The rotation of the crankshaft CS is transferred to driving wheels (not shown) through a power train (not shown) to thereby drive the vehicle.

In the vehicle, for slowing down or stopping the vehicle, a brake actuator BA is installed for each of wheels of the vehicle.

Under control of the ECU 40 in response to the driver's depression of a brake pedal BP, the brake actuator BA is designed to hydraulically apply a braking force to a corresponding wheel to thereby slow down or stop the rotation of a corresponding wheel.

In the vehicle, for cranking the engine 10, a starter 39 is installed and communicably connected to the ECU 40.

Under control of the ECU 40, the starter 39 causes the crankshaft CS to begin to turn; this turn starts the engine running and so starts the vehicle.

In the vehicle, for measuring the operating conditions of the engine 10 and the driving conditions of the vehicle, various sensors SE are installed. Each of the sensors SE is operative to continuously or periodically measure an instant value of a corresponding one parameter associated with the operating conditions of the engine 10 and/or the vehicle and to continuously or periodically output, to the ECU 40, data indicative of the measured value of a corresponding one parameter.

For example, the sensors SE include, in addition to the airflow meter 13, the throttle position sensor 15a, the intake manifold pressure sensor 17, and the accelerator sensor 3, a coolant temperature sensor 34, a crank angle sensor 35, a brake sensor 37, a vehicle speed sensor 38, and an accelerator sensor (throttle position sensor) 42; these sensors SE are electrically connected to the ECU 40.

The coolant sensor 34 is attached to the engine 10 and operative to provide the ECU 40 with data indicative of the temperature of a coolant in the engine 10.

The crank angle sensor 35 is placed close to the crankshaft CS and operative to output, to the ECU 40, a pulsed crank signal each time the crankshaft CS is rotated by a preset crank angle, such as 30 crank degrees.

The brake sensor 37 is operative to measure the stroke or position of the brake pedal BP of the vehicle depressed by the driver, and output, as data representing a driver's deceleration request, the measured stroke or position of the brake pedal 37.

The vehicle speed sensor 38 is operative to cyclically measure the vehicle speed and output, as data, the measured vehicle speed.

The ECU 40 is mainly made up of a microcomputer 41 consisting of, for example, a CPU, a storage medium 41a including a ROM (Read Only Memory), such as a rewritable ROM, a RAM (Random Access Memory), and the like, an IO (Input and output) interface, and so on.

The storage medium 40a stores therein beforehand various engine control programs.

The ECU 40 is operative to:

receive pieces of data measured by the sensors SE and outputted therefrom; and control, based on the operating conditions of the engine 10 determined by at least some of the received pieces of data measured by the sensors SE, various actuators including the throttle actuator 15, the injectors 19, the igniters 28, the brake actuators BA, and so on to hereby adjust various controlled variables of the engine 10.

For example, the ECU 30 is programmed to:

compute a proper injection quantity for the injector 19 for each cylinder and a proper ignition timing for the igniter 28;

instruct the injector 19 for each cylinder to spray, at a corresponding computed proper injection timing, a corresponding computed proper quantity of fuel into each cylinder; and instruct the igniter 28 for each cylinder to ignite an air-fuel mixture in each cylinder at a corresponding computed proper ignition timing.

In addition, the engine control programs stored in the storage medium 41a include an idle reduction routine (engine automatic stop-and-restart control routine) R1. The ECU 40, that is, the microcomputer 41, repeatedly runs the idle reduction routine R1 in a given cycle during its being energized.

Specifically, in accordance with the idle reduction routine (engine automatic stop-and-restart control routine) R1, when determining that at least one of predetermined engine automatic stop conditions is met based on the data measured by the sensors SE, the ECU 40 carries out an engine automatic stop task. The engine automatic stop task is to control the injector 19 and/or the igniter 28 for each cylinder to stop the burning of the air-fuel mixture in each cylinder. The stop of the burning of the air-fuel mixture in each cylinder of the engine 10 means the automatic stop of the engine 10.

The predetermined engine automatic stop conditions include, for example, the following conditions that the stroke of the accelerator pedal AP is zero (the throttle valve 14 is fully closed so that the engine 10 is in idle), the driver depresses the brake pedal BP, and the vehicle speed is equal to or lower than a preset speed (idle-reduction execution speed) VIS, for example, 20 km/h.

During the automatic stop of the engine 10, the rotational speed of the engine 10 is automatically decelerated, in other words, the crankshaft CS coasts. During the engine 10 being stopped, when determining that at least one of predetermined engine restart conditions is met based on the data measured by the sensors SE, the ECU 40 carries out an engine restart task. The engine automatic stop task is to:

drive the starter 39 so that the starter 39 causes the crankshaft CS to begin to turn at an initial speed (idle speed);

instruct the injector 19 for each cylinder to restart spraying fuel into a corresponding cylinder; and instruct the igniter 28 for each cylinder to restart igniting the air-fuel mixture in a corresponding cylinder.

The predetermined engine restart conditions include, for example, the following conditions that:

the accelerator pedal AP is depressed (the throttle valve 14 is opened); and the stroke of the driver's brake pedal BP is zero (the driver completely releases the brake pedal BP).

As described above, in the first embodiment, because the idle-reduction execution speed VIS is set to, for example, 20 km/h, the idle reduction routine R1 is carried out during the vehicle being decelerated in addition to during the vehicle being stopped. Specifically, while the vehicle is running at speed faster than the idle-reduction execution speed VIS, when the driver depresses the brake pedal BP, the ECU 40 carries out fuel cut-off control to thereby temporarily stop the supply of fuel to at least one of the plurality of cylinders. This fuel cut-off control causes the vehicle speed to automatically drops.

Thereafter, when the vehicle speed is equal to or lower than the idle-reduction execution speed VIS while the brake pedal BP is depressed, the ECU 40 automatically stops the engine 10.

Here, let us consider that, after the automatic stop of the engine 10, the engine restart task is carried out when at least one of the engine restart conditions is met.

In this case, under conditions that the accelerator pedal AP and the brake pedal BP are alternately operated repeatedly, such as under traffic jam conditions, the idle reduction routine may be repeatedly carried out due to the repetitive operations of the accelerator pedal AP and brake pedal BP. These repeated executions of the idle reduction routine may cause the engine automatic stop and engine automatic restart to be frequently repeated. This results in that the engine automatic stop may be repeatedly carried out against the driver's intention, reducing the drivability of the vehicle.

These repeated executions of the idle reduction routine may also increase the frequency of activating the starter 39; this may increase the power consumption of the starter 39 and overload the starter 39.

In order to address such disadvantages, the engine control system 1 according to the first embodiment is designed to, when the engine 10 has been automatically restarted after the automatic stop of the engine 10, limit the next automatic stop of the engine 10 until the vehicle speed after the engine restart is equal to or higher than a preset threshold (stop enabling vehicle-speed) VES.

Particularly, in the first embodiment, in consideration that the engine automatic stop is carried out during the vehicle being decelerated in addition to during the vehicle being stopped, the engine control system 1 is designed to variably determine the stop enabling vehicle-speed VES depending on a restart-timing vehicle speed VST measured each time the engine-automatic restart begins. Note that the stop enabling vehicle-speed VES corresponds to a vehicle-speed threshold.

The reason why the stop enabling vehicle-speed is made variable is as follows:

Specifically, if the stop enabling vehicle-speed VES was set to a constant value of for example, 15 km/h, during the engine being decelerated, when at least one of the engine restart conditions was met before the vehicle speed reached zero so that the vehicle was slightly accelerated, the restart of the engine would cause the vehicle speed to easily reach the constant stop enabling vehicle-speed. This would enable the engine automatic stop. In addition, if the stop enabling vehicle-speed VES was set to a constant value of, for example, 15 km/h, during the engine being decelerated, when at least one of the engine restart conditions was met, the vehicle speed would exceed the stop enabling vehicle-speed VES. This would enable the engine automatic stop at the time of restart of the engine 10.

Figure 2:
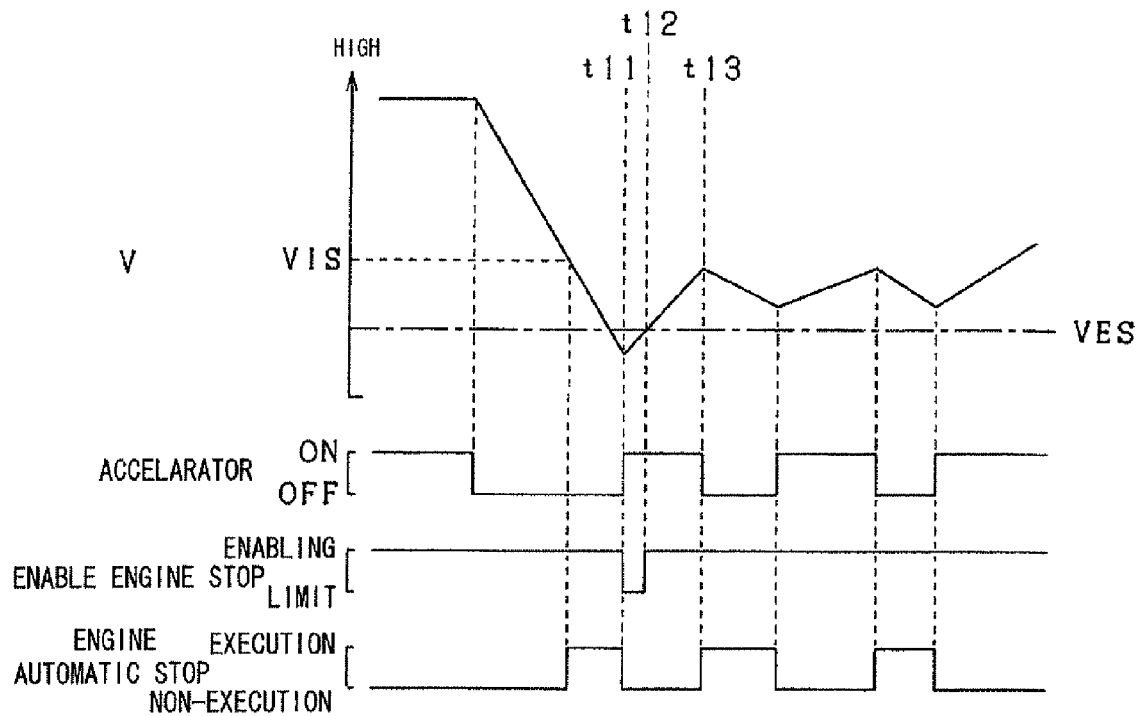
FIG. 2 is a timing chart schematically illustrating the transition of a vehicle speed and that of an operating state of the internal combustion engine according to the first embodiment.
Figure 3:
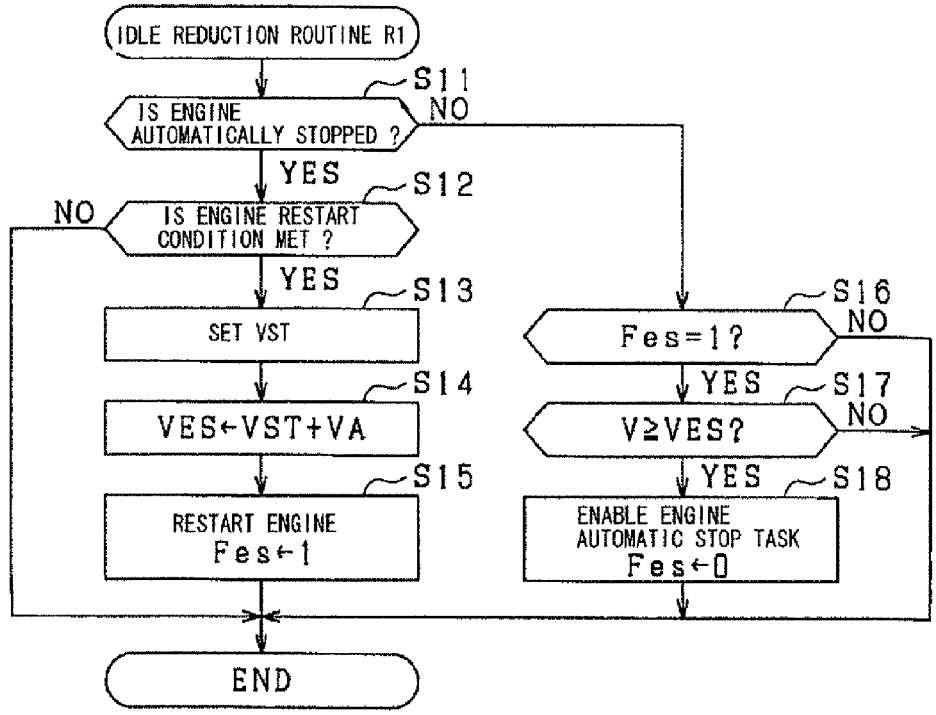
FIG. 3 is a flowchart schematically illustrating an idle reduction routine to be executed by an ECU illustrated in FIG. 1 according to the first embodiment.

These events will be described in detail hereinafter with reference to FIG. 2. FIG. 2 is a timing chart schematically illustrating the transition of the vehicle speed V and that of an operating state of the engine 10. Note that, in FIG. 2, the stop enabling vehicle-speed VES is deter mined to be lower than the idle-reduction execution speed VIS.

For example, when the vehicle is decelerated under fuel cut-off control so that the vehicle speed V becomes lower than the idle-reduction execution speed VIS, as illustrated in FIG. 2, the engine 10 is automatically stopped as long as an alternative one of the engine automatic stop conditions is met (in FIG. 2, as long as the accelerator pedal AP is not depressed, in other words, accelerator is in off).

When at least one of the engine restart conditions is met at a timing t11 before the vehicle speed V is zero (in FIG. 2, the accelerator pedal AP is depressed), the engine 10 is restarted so that the vehicle speed V is increased. When the vehicle speed V exceeds the stop enabling vehicle-speed VES at a timing t12 immediately after the vehicle speed V is reversed from down to up, the automatic stop of the engine 10 is enabled at the timing t12. Thus, when at least one of the engine automatic stop conditions is met (in FIG. 2, the accelerator pedal AP is released) at a timing t13 after the timing t12, the engine 10 is automatically stopped.

That is, even if the stop enabling vehicle-speed VES is set, frequent operations of the brake pedal 13P and the accelerator pedal AP after the restart of the engine 10 may cause the engine automatic stop and engine automatic restart to be frequently repeated.

Thus, the engine control system 1 is designed to variably determine the stop enabling vehicle-speed VES depending on the restart-timing vehicle speed VST measured each time the engine-automatic restart begins.

Specifically, the engine control system 1 is designed to:

set the restart-timing vehicle speed VST to a value of the vehicle speed V measured each time at least one of the engine restart conditions is met;

determine the stop enabling vehicle-speed VES to a value higher than the restart-timing vehicle speed VST by a preset value VA; and limit the automatic stop of the engine 10 until the vehicle speed V measured by the vehicle speed sensor 38 is equal to or higher than the stop enabling vehicle-speed VES.

Note that the limit of the automatic stop of the engine 10 according to the first embodiment includes: disabling of the automatic stop of the engine 10; and limiting the number of execution of the automatic stop of the engine 10.

The idle-reduction routine (program) R1 included in the engine control programs stored in the storage medium 41a to be executed by the ECU 40 (microcomputer 41) will be described hereinafter. The ECU 40 repeatedly runs the idle-reduction routine R1 in a given cycle during its being energized.

Specifically, when launching the idle-reduction routine R1, the ECU 40 determines whether the engine 10 is automatically stopped (burning is stopped) in step S11.

Upon deter mining that the engine 10 is automatically stopped (YES in step S11), the ECU 40 proceeds to step S12, and determines whether at least one of the engine restart conditions is met in step S12.

Upon determining that no engine restart conditions are met (NO in step S12), the ECU 40 terminates the idle-reduction routine R1.

Otherwise, upon determining that at least one of the engine restart conditions is met (YES in step S12), the ECU 40 sets the restart-timing vehicle speed VST to a value of the vehicle speed V at the timing when at least one of the engine restart conditions is met in step S13.

Next, in step S14, the ECU 40 determines the stop enabling vehicle-speed VES according to the restart-timing vehicle speed VST. In the first embodiment, the ECU 40 adds the restart-timing vehicle speed VST to the preset value VA, such as 15 km/h, to thereby determine, as the stop enabling vehicle-speed VES, the sum of the restart-timing vehicle speed VST and the preset value VA in step S14. The preset value VA enables the ECU 40 to, after the engine 10 has been automatically restarted since the vehicle speed of zero, carry out the next automatic stop of the engine when the vehicle speed V is equal to or higher than the preset value VA.

That is, when the engine restart is carried out before the vehicle sped V reaches zero, the stop enabling vehicle-speed VES is determined to the vehicle speed V at the engine restart timing over the preset value VA.

In step S15, the ECU 40 outputs, to the starter 39, a drive signal that drives the starter 39 to turn the crankshaft CS so a to restart the engine 10, and sets an automatic-stop limiting flag Fes to a preset bit, such as 1. Thereafter, the ECU 40 exits the idle-reduction routine R1.

Note that the information of the automatic-stop limiting flag Fes represents that the next automatic stop of the engine 10 after the current restart of the engine 10. That is, the automatic-stop limiting flag Fes of 1 represents that the next automatic stop of the engine 10 is limited, and the automatic-stop limiting flag Fes of 0 represents that the next automatic stop of the engine 10 is enabled. Thereafter, the ECU 40 terminates the idle reduction routine R1.

Thus, in the next execution of the idle reduction routine R1, the determination in step S11 is negative.

Specifically, upon determining that the engine 10 is automatically restarted according to when at least one of the engine restart conditions is met (NO in step S11), the ECU 40 proceeds to step S16, and determines whether the automatic-stop limiting flag Fes is set to 1 in step S16.

Upon determining that the automatic-stop limiting flag Fes is set to 0 (NO in step S16), the ECU 40 terminates the idle reduction routine R1.

Otherwise, upon determining that the automatic-stop limiting flag Fes is set to 1 (YES in step S16), the ECU 40 determines whether a value of the vehicle speed V measured by the vehicle speed sensor 38 at that time is equal to or higher than the stop enabling vehicle-speed VES in step S17. Note that the stop enabling vehicle-speed VES to be used in step S17 is determined by the operation in step S14; this operation in step S14 is executed immediately before the automatic-stop limiting flag Fes is shifted from 0 to 1 in step S15.

Upon determining that the value of the vehicle speed V measured by the vehicle speed sensor 38 is lower than the stop enabling vehicle-speed VES (NO in step S17), the ECU 40 exits the idle-reduction routine R1 with the automatic-stop limiting flag Fes being kept at 1. Specifically, the ECU 40 maintains limiting of the next automatic stop of the engine 10. Thus, the vehicle speed V is increased by the restart of the engine 10.

Otherwise, upon determining that the value of the vehicle speed V measured by the vehicle speed sensor 38 is equal to or higher than the stop enabling vehicle-speed VES (YES in step S17), the ECU 40 proceeds to step S18, and resets the automatic-stop limiting flag of 1 to 0 in step S18. This enables the engine automatic stop task to be carried out when at least one of the engine automatic stop conditions is met.

Note that, when the ECU 40 executes the idle-reduction routine R1 immediately before an ignition switch (not shown) for supplying power to the vehicle control system 1 from a battery (not shown), the ECU 40 determines the stop enabling vehicle-sped VES to an initial value V0 corresponding to the preset value VA, and sets the automatic-stop limiting flag Fes to an initial value of 1. This initial setting limits repetitions of the engine automatic stop-and-restart tasks immediately after the engine start in response to the ignition-switch on.

Figure 4:
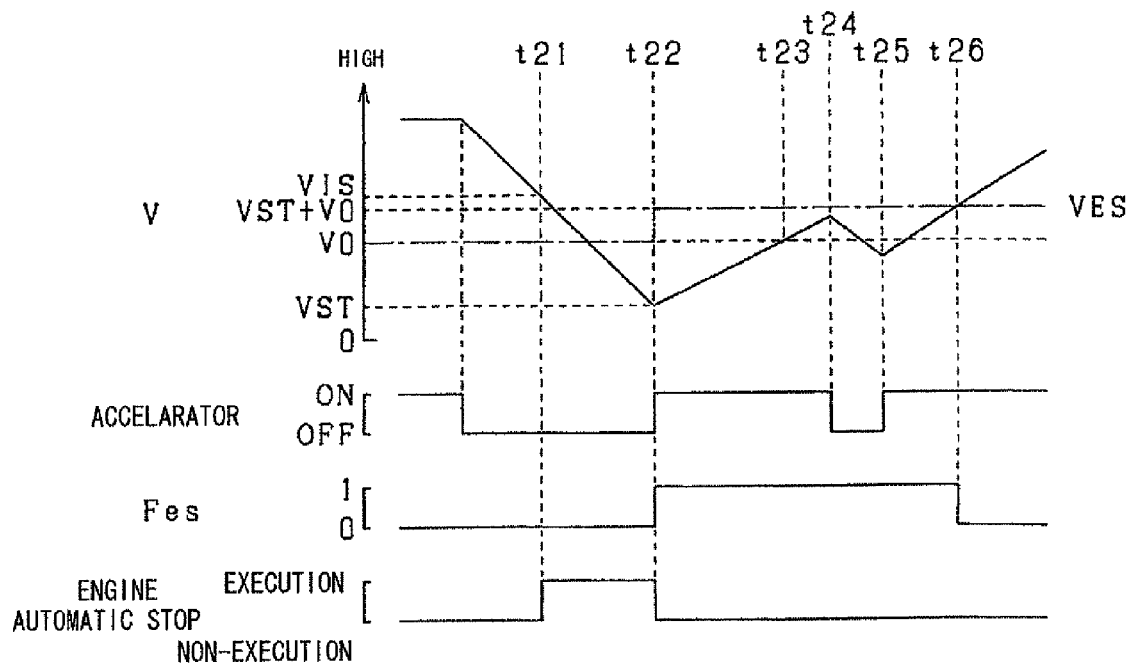
FIG. 4 is a timing chart schematically illustrating the transition of the vehicle speed and that of an operating state of the internal combustion engine when the idle reduction routine according to the first embodiment is carried out.

FIG. 4 is a timing chart schematically illustrating the transition of the vehicle speed V and that of an operating state of the engine 10 when the idle reduction routine R1 according to the first embodiment is carried out. In FIG. 4, the engine automatic stop task and the engine restart task are assumed to be carried out while the stop enabling vehicle-speed VES is determined to the initial value V0 equal to the preset value VA. In addition, in FIG. 4, at least one of the engine automatic stop conditions is that the vehicle speed V is equal to or lower than the idle-reduction execution speed VIS during the accelerator pedal AP is not depressed (in off state). In FIG. 4, at least one of the engine restart conditions is that the accelerator pedal AP is depressed (in on state).

When the vehicle is decelerated so that the vehicle speed V becomes lower than the idle-reduction execution speed VIS, as illustrated in FIG. 4, the engine 10 is automatically stopped at a timing t21 as long as the accelerator pedal AP is not depressed (in off state) (see YES in step S11).

Thereafter, when the accelerator pedal AP is depressed (in on state) at a timing t22, it is determined that at least one of the engine restart conditions is met so that the engine 10 is restarted before the vehicle speed V reaches zero (see steps S12 and S15). In addition, at the timing t22, the stop enabling vehicle-speed VES is changed to the sum of the initial value V0 (the preset value VA) and the restart-timing vehicle speed VST (see steps S13 and S14), and the automatic-stop limiting flag Fes is set to 1 (see step S15).

When the engine 10 is restarted so that the vehicle speed V is increased to reach the stop enabling vehicle-speed VES at a timing t26 (see NO in step S11 and steps S16 and S17), the automatic-stop limiting flag Fes is reset to 0. This enables the automatic stop of the engine 1 after the timing t26 (see step S18).

Specifically, in FIG. 4, when the engine 10 is restarted at the timing t22, the stop enabling vehicle-speed VES is changed to be higher than the initial value V0. For this reason, when the vehicle speed V reaches the initial value V0 at a timing t23 after the timing t22, the next automatic stop of the engine 10 is not enabled so that the automatic-stop limiting flag Fes is maintained at 1. That is, even if the vehicle speed V is slightly accelerated, the automatic stop of the engine 10 is disabled.

Therefore, even if the accelerator pedal AP is released (turned off) in a timing t24 after the timing t23, the automatic stop of the engine 10 is disabled until the vehicle speed V is shifted to be equal to or higher than the changed value (VST V0) of the stop enabling vehicle-speed VES. Thus, it is possible to limit repetitions of the engine automatic stop-and-restart tasks.

As described above, the engine control system 1 according to the first embodiment achieves the following advantages.

Because the engine control system 1 is configured to variably set the stop enabling vehicle-speed VES depending on the restart-timing vehicle speed VST measured each time the engine-automatic restart begins, even if the vehicle is slightly accelerated after the engine 10 is restarted, it is possible to prevent the vehicle speed V from reaching and exceeding the stop enabling vehicle-speed VES.

Specifically, because the engine control system 1 is configured to deter mine the threshold value (stop enabling vehicle-speed VES) to be higher than the restart-timing vehicle speed VST, it is possible to make difficult that vehicle-speed condition for enabling the automatic stop of the engine 10 is met. Thus, even if the engine 10 is automatically stopped during the vehicle being decelerated, it is possible to limit the automatic stop of the engine 10 immediately after or during the restart of the engine 10. This makes it effectively limit repetitions of the engine automatic stop and engine restart.

In addition, the engine control system 1 is configured to set, as the restart-timing vehicle speed VST, a value of the vehicle speed V measured each time at least one of the engine restart conditions is met, and to determine the stop enabling vehicle-speed VES based on the restart-timing vehicle speed VST. This configuration allows the stop enabling vehicle-speed VES to be set to an appropriate value immediately after the restart of the engine 10.

Second Embodiment

An engine control system according to the second embodiment of the present invention will be described hereinafter with reference to FIGS. 5 and 6.

The hardware and software structures of the engine control system according to the second embodiment are substantially identical to those of the engine control system 1 according to the first embodiment except for the following points. So, like parts between the engine control systems according to the first and second embodiments, to which like reference characters are assigned, are omitted or simplified in description.

As described above, the engine control system 1 according to the first embodiment is designed to determine the stop enabling vehicle-speed VES based on the restart-timing vehicle speed VST.

In addition to the structure, the engine control system according to the second embodiment is designed to set the stop enabling vehicle-speed VES based on the restart-timing vehicle speed VST, and, when the vehicle speed V is reversed from up to down, change the stop enabling vehicle-speed VES according to the reduction in the vehicle speed V. A task of setting the stop enabling vehicle-speed VES according to the second embodiment will be described in detail hereinafter.

Figure 5:
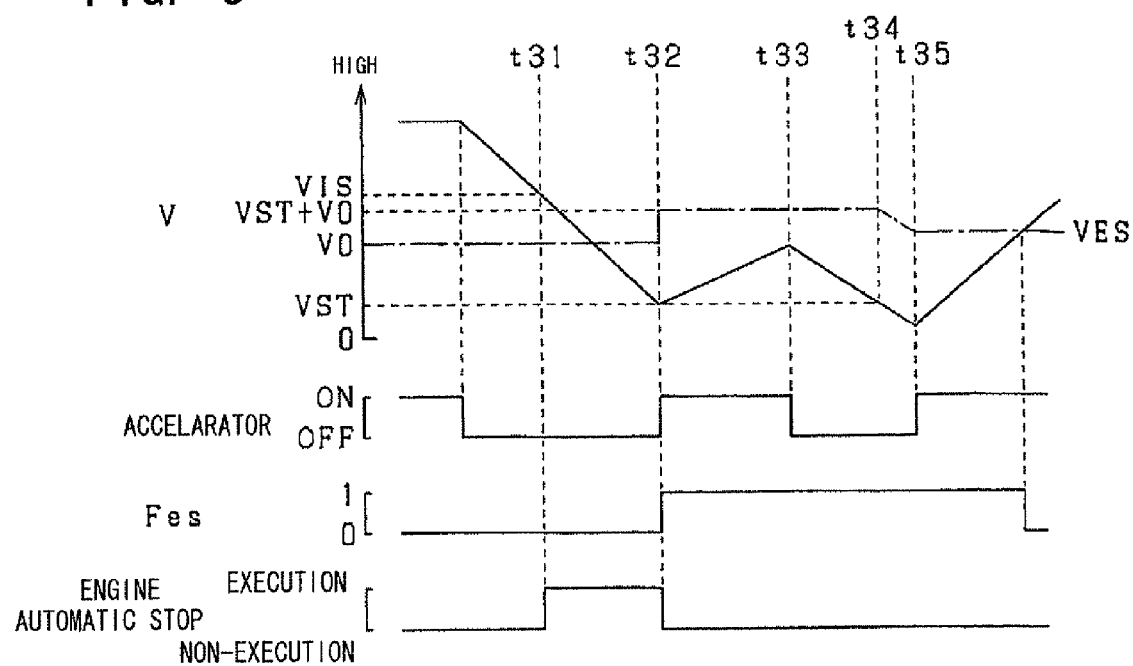
FIG. 5 is a timing chart schematically illustrating the transition of the vehicle speed and that of an operating state of the internal combustion engine when an idle reduction routine according to the second embodiment of the present invention is carried out.

FIG. 5 is a timing chart schematically illustrating the transition of the vehicle speed V and that of an operating state of the engine 10 when an idle reduction routine R2 according to the second embodiment is carried out. In FIG. 5, the engine automatic stop task and the engine restart task are assumed to be carried out while the stop enabling vehicle-speed VES is determined to the initial value V0 equal to the preset value VA. In addition, in FIG. 5, at least one of the engine automatic stop conditions is that the vehicle speed V is equal to or lower than the idle-reduction execution speed VIS during the accelerator pedal AP is not depressed (in off state). In FIG. 5, at least one of the engine restart conditions is that the accelerator pedal AP is depressed (in on state).

When the vehicle is decelerated so that the vehicle speed V becomes lower than the idle-reduction execution speed VIS, as illustrated in FIG. 5, the engine 10 is automatically stopped at a timing t31 as long as the accelerator pedal AP is not depressed (in off state).

Thereafter, when the accelerator pedal AP is depressed (in on state) at a timing t32, it is determined that at least one of the engine restart conditions is met so that the engine 10 is restarted before the vehicle speed V reaches zero. In addition, at the timing t32, the stop enabling vehicle-speed VES is set based on the restart-timing vehicle speed VST, and the automatic-stop limiting flag Fes is set to 1. Specifically, at the timing t32, the stop enabling vehicle-speed VES is changed to the sum of the initial value V0 (the preset value VA) and the restart-timing vehicle speed VST.

When the engine 10 is restarted so that the vehicle speed V is reversed from down to up, and thereafter, reversed again from up to down at a timing t33 before the vehicle speed V reaches the stop enabling vehicle-speed VES, the engine control system according to the second embodiment is specially configured to reduce the stop enabling vehicle-speed VES depending on the reduction in the vehicle speed V.

Specifically, the engine control system is configured to reduce a setting value of the stop enabling vehicle speed VES at a rate that is substantially identical to the rate of reduction in the vehicle speed V during a period after a timing t34 at which the vehicle speed V becomes lower than the restart-timing vehicle speed VST.

Thereafter, at a timing t35 when the vehicle speed V is reversed again from down to up, the engine control system is configured to maintain the stop enabling vehicle-speed VES at an actual setting value at the timing t35. Thereafter, when the vehicle speed V reaches the setting value of the stop enabling vehicle-speed VES, the engine control system is configured to reset the automatic-stop limiting flag Fes to 0.

Figure 6:
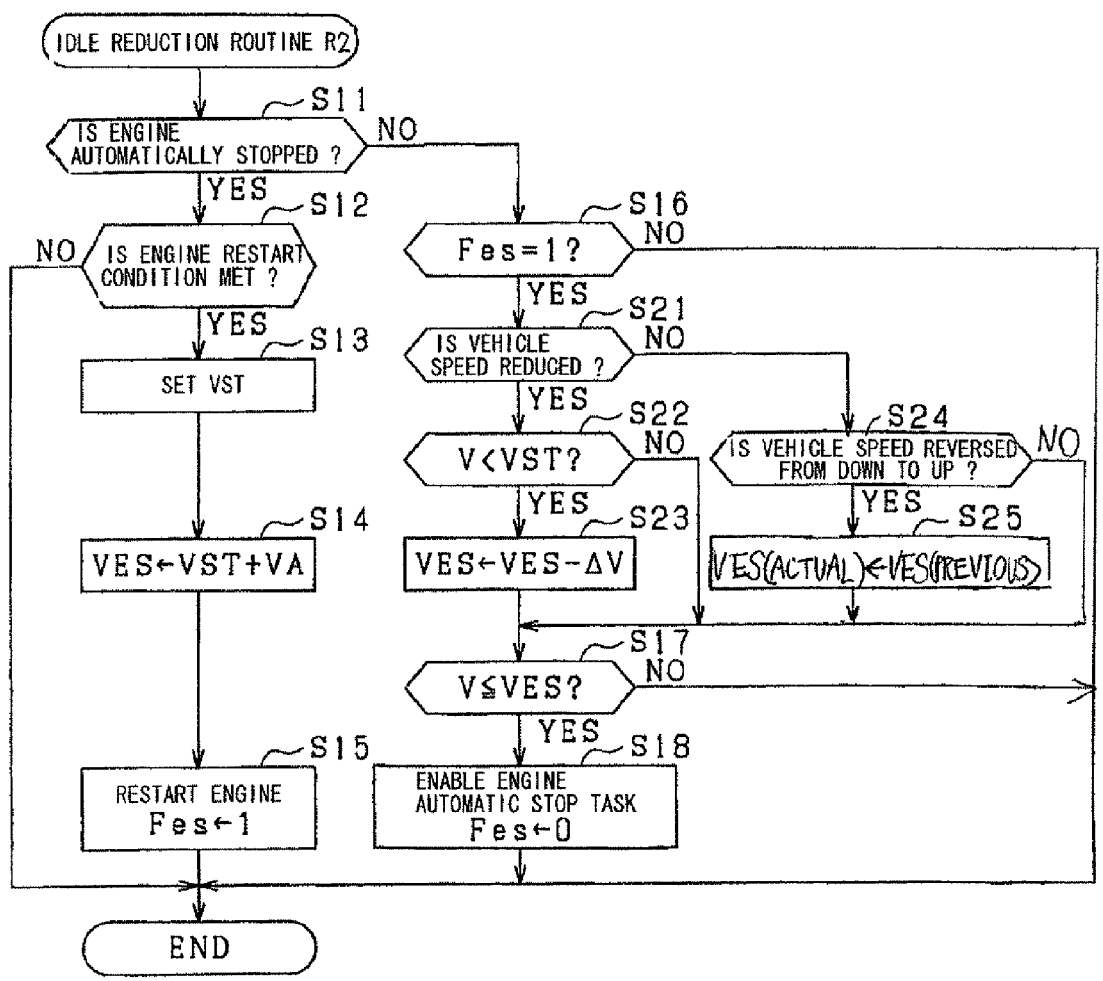
FIG. 6 is a flowchart schematically illustrating the idle reduction routine according to the second embodiment to be executed by the ECU.

FIG. 6 is a flowchart schematically illustrating the idle reduction routine R2 according to the second embodiment; a part of this idle reduction routine R2 is different from the idle reduction routine R1 according to the first embodiment. So, like steps between the idle reduction routines R1 and R2 according to the first and second embodiments, to which like reference characters are assigned, are omitted or simplified in description. Like the first embodiment, the ECU 40 repeatedly runs the idle-reduction routine R2 in a given cycle during its being energized.

Specifically, when launching the idle-reduction routine R2, the ECU 40 carries out the same operations in steps S11 to S15. That is, the ECU 40 determines the stop enabling vehicle-speed VES by adding the restart-timing vehicle speed VST to the preset value VA (initial value V0).

When it is determined that the automatic-stop limiting flag Fes is set to 1 (YES in step S16), the ECU 40 proceeds to step S21. In step S21, the ECU 40 determines whether the vehicle speed V is reduced according to, for example, data measured by the vehicle speed sensor 38.

Upon determining that the vehicle speed V is reduced (YES in step S21), the ECU 40 proceeds to step S22, and determines whether the vehicle speed V is lower than the restart-timing vehicle speed VST in step S22.

Upon deter mining that the vehicle speed V is lower than the restart-timing vehicle speed VST (YES in step S22), the ECU 40 proceeds to step S23, and reduces the stop enabling vehicle-speed VES in step S23.

For example, in step S23, the ECU 40 subtracts, from the actual setting value (previous value) of the stop enabling vehicle-speed VES in the previously executed step S23, an absolute value ΔV of the deviation between a previously measured value of the vehicle speed V corresponding to the previous value of the stop enabling vehicle-speed VES and an actually measured value of the vehicle speed V, thus calculating an actual setting value of the stop enabling vehicle speed VES in the actually executed step S23 (see a period between the timing t34 and the timing t35).

In the second embodiment, when reducing the stop enabling vehicle-speed VES in step S23, the ECU 40 holds the initial value V0 as a lower limit of the stop enabling vehicle-speed VES. This prevents the next engine automatic stop from being enabled on a more relaxed requirement in comparison to when the engine 10 is started at the vehicle speed V of zero.

Note that, even if the vehicle is decelerated, until the vehicle speed V is lower than the restart-timing vehicle speed VST, the stop enabling vehicle-speed VES is maintained (NO in step S22). The holding of the stop enabling vehicle-speed VES is carried out within a period between the timing t33 and the timing t34 in FIG. 5.

Otherwise, the vehicle speed V is not reduced (NO in step S21), the ECU 40 proceeds to step S24, and determines whether the vehicle speed V is reversed from down to up in step S24. When it is determined that the vehicle speed V is reversed from down to up (YES in step S24 corresponding to the timing t35), the ECU 40 proceeds to step S25. In step S25, the ECU 40 terminates the reduction in the stop enabling vehicle-speed VES, and sets the setting value of the stop enabling vehicle-speed VES in the previously executed step S23 to an actual setting value of the stop enabling vehicle-speed VES (see the timing t35).

As described above, the engine control system according to the second embodiment achieves the following advantages.

Specifically, the engine control system according to the second embodiment is configured to set the stop enabling vehicle-speed VES to be higher than the initial value V0, and reduce the stop enabling vehicle-speed VES when the vehicle speed V is reduced after the restart of the engine 10. This configuration prevents the stop enabling vehicle-speed VES from being set excessively higher than the vehicle speed V. This prevention properly maintains the balance between the improvement of fuel efficiency and the limit of repetitions of the engine automatic stop and restart.

The engine control system according to the second embodiment is configured to reduce the stop enabling vehicle-speed VES by the absolute value ΔV of the deviation between a previous value of the vehicle speed V corresponding to the previous value of the stop enabling vehicle-speed VES and an actually measured value of the vehicle speed V. Thus, it is possible to reduce the increase in the stop enabling vehicle-speed VES from the initial value V0 by only the reduction in the vehicle speed V.

The engine control system according to the second embodiment is configured to set the lower limit of the stop enabling vehicle-speed VES to the initial value V0. This configuration prevents the next engine automatic stop from being enabled on a more relaxed requirement in comparison to when the engine 10 is started at the vehicle speed V of zero. This effectively limits the automatic stop of the engine 10 even if the vehicle speed V is slightly accelerated.

The engine control system according to the second embodiment is configured to reduce the stop enabling vehicle-speed VES at a timing when the vehicle speed V after the restart of the engine 10 is lower than the restart-timing vehicle speed VST. This configuration reflects a reduction of the vehicle speed V from the restart-timing vehicle speed VST on the stop enabling vehicle-speed.

The present invention is not limited to the descriptions set forth above.

Figure 7:
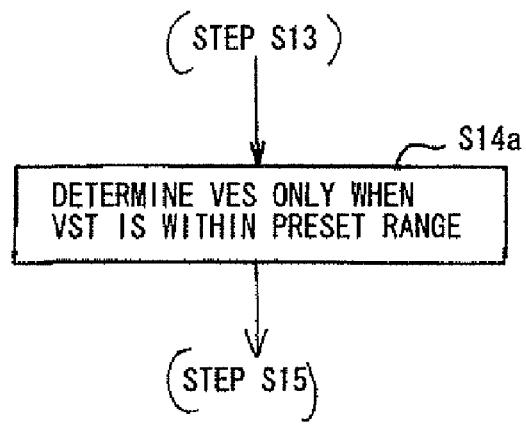
FIG. 7 is a flowchart schematically illustrating part of an idle reduction routine according to a modification of the present invention to be executed by the ECU.

Each of the engine control systems according to the first and second embodiments can be designed to determine the stop enabling vehicle-speed VES based on the restart-timing vehicle speed VST only when the restart-timing vehicle speed VST is within a preset range in step S14a of FIG. 7.

Specifically, each of the engine control systems can be configured to change the stop enabling vehicle-speed VES from its initial value V0 when the restart-timing vehicle speed VST is equal to or higher than a predetermined speed Vx within a range from zero to the idle-reduction execution speed VIS. In addition, each of the engine control systems can be configured to maintain the stop enabling vehicle-speed VES at the initial value V0 when the restart-timing vehicle speed VST is lower than the predetermined speed Vx.

This modification prevents change of the stop enabling vehicle-speed VES when the restart-timing vehicle speed VST is close to zero, thus reducing the frequency of resetting the stop enabling vehicle-speed VES.

Figure 8A:
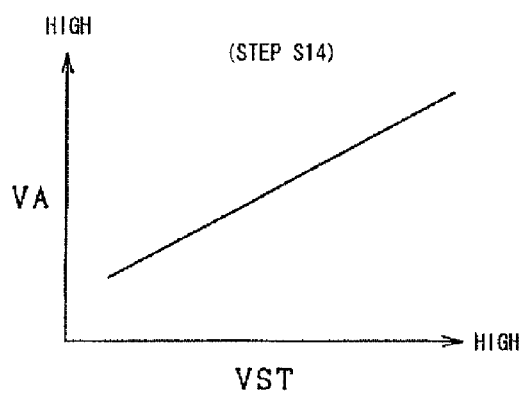
FIG. 8A is a graph schematically illustrating the relationship between the vehicle speed and a stop enabling vehicle-speed according to an alternative modification of the present invention.
Figure 8B:
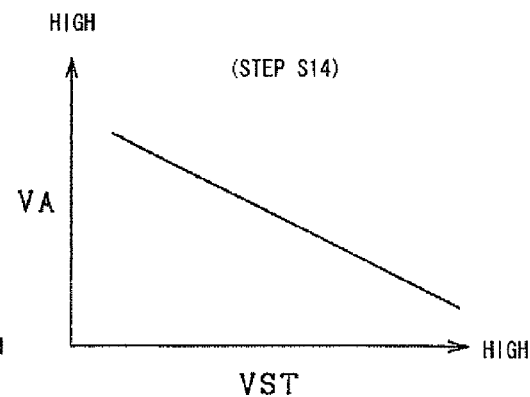
FIG. 8B is a graph schematically illustrating the relationship between the vehicle speed and a stop enabling vehicle-speed according to an alternative modification of the present invention.

In each of the first and second embodiments, the preset value VA is maintained at the initial value V0, but it can be variable depending on the restart-timing vehicle speed VST. For example, as illustrated in FIG. 8A, the preset value VA can be increased with increase in the restart-timing vehicle speed VST in step S14. In addition, as illustrated in FIG. 8B, the preset value VA can be reduced with reduction in the restart-timing vehicle speed VST in step S14. An upper limit and/or a lower limit can be determined for the variable preset value VA.

In the second embodiment, the engine control system is configured to start the reduction in the stop enabling vehicle-speed VES at a timing when the vehicle speed V is lower than the restart-timing vehicle speed VST, but the present invention is not limited thereto. Specifically, the engine control system can be configured to start the reduction in the stop enabling vehicle-speed VES at a timing when the vehicle speed V is reversed from up to down after the restart of the engine 10.

Figure 9:
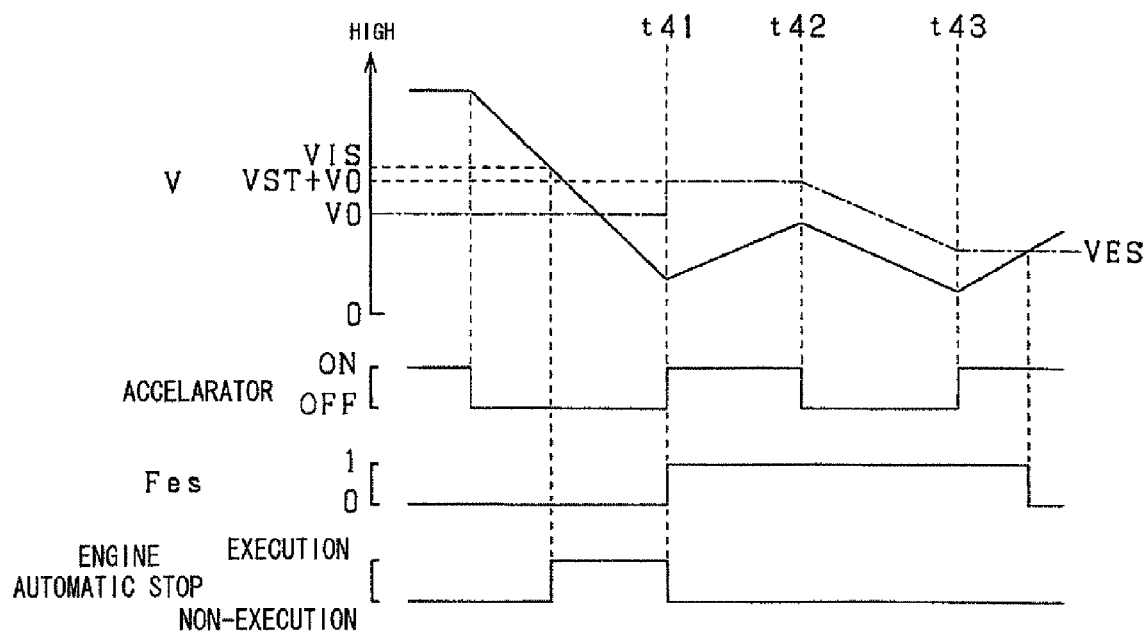
FIG. 9 is a timing chart schematically illustrating the transition of the vehicle speed and that of an operating state of the internal combustion engine when an idle reduction routine according an alternative modification of the present invention is carried out.

Specifically, as illustrated in the timing chart of FIG. 9, when the engine 10 is restarted so that the vehicle speed V is reversed from down to up at a timing t41, and thereafter, reversed again from up to down at a timing t42 before the vehicle speed V reaches the stop enabling vehicle-speed VES. At that time, the engine control system according to this modification can be configured to reduce the stop enabling vehicle speed VES according to the reduction in the vehicle speed V during a period from the timing t42 to a timing t43; this timing t43 corresponds to a timing when the vehicle speed V is reversed again from down to up after the timing t42.

More specifically, the engine control system according to this modification can be configured to reduce the stop enabling vehicle speed VES at a rate that is substantially identical to the rate of reduction in the vehicle speed V during the period from the timing t42 to the timing t43.

Then, at the timing t42, the engine control system according to this modification can be configured to maintain the stop enabling vehicle-speed VES at an actual setting value at the timing t42. Thereafter, when the vehicle speed V reaches the setting value of the stop enabling vehicle-speed VES, the engine control system according to this modification can be configured to reset the automatic-stop limiting flag Fes to 0.

The engine control systems according to the second embodiment is configured to, when changing the stop enabling vehicle-speed VES according to the reduction in the vehicle speed V, subtract, from the stop enabling vehicle-speed VES, an absolute value ΔV of the deviation between a previously measured value of the vehicle speed V corresponding to the previous value of the stop enabling vehicle-speed VES and an actually measured value of the vehicle speed V for each vehicle-speed measurement cycle. The present invention is however not limited to the configuration.

Specifically, the engine control systems according to the second embodiment is configured to, when changing the stop enabling vehicle-speed VES according to the reduction in the vehicle speed V, subtract, from the stop enabling vehicle-speed VES, any reduction value. For example, the reduction value can be increased or reduced with increase in the change of the vehicle speed V. The rate of reduction in the stop enabling vehicle-speed VES can be set to a constant or to be variable.

Figure 10:
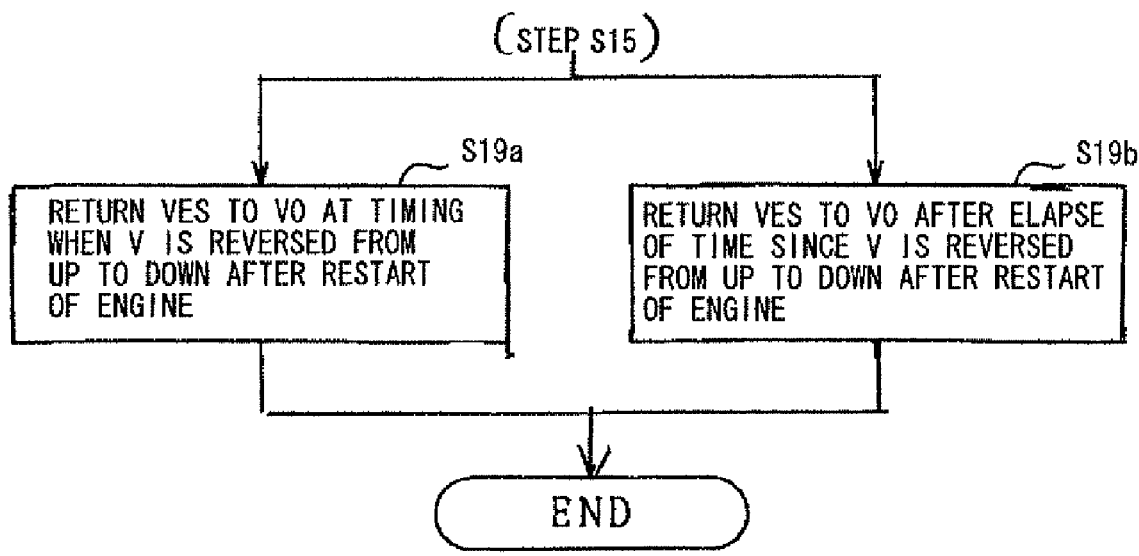
FIG. 10 is a flowchart schematically illustrating part of an idle reduction routine according to an alternative modification of the present invention to be executed by the ECU.

In each of the first and second embodiments, the stop enabling vehicle-speed VES can be returned to the initial value V0 at a timing when the vehicle speed V is reversed from up to down after the restart of the engine 10 in step S19a of FIG. 10. Moreover, the stop enabling vehicle-speed VES can be returned to the initial value V0 after an elapse of time since the vehicle speed V is reversed from up to down after the restart of the engine 10 in step S19b of FIG. 10.

In addition, the engine control system according to each of the first and second embodiments can be configured to:

use the stop enabling vehicle-speed VES set according to the restart-timing vehicle speed VST for a preset period after the restart of the engine 10 although the vehicle speed V is reversed from up to down; and return the stop enabling vehicle-speed VES to the initial value V0 after an elapse of the preset period since the restart of the engine 10.

Each of the engine control systems according to the first and second embodiments is configured to change the stop enabling vehicle-speed VES based on a value (restart-timing vehicle speed VST) of the vehicle speed V measured when at least one of the engine restart conditions is met, but the present invention is not limited thereto.

Specifically, each of the engine control systems according to the first and second embodiments can be configured to change the stop enabling vehicle-speed VES based on a value of the vehicle speed V measured at a point of time when the restart of the engine 10 is completed (at a point of time when the rotational speed of the engine 10 exceeds a predetermined complete-explosion determining threshold). Moreover, each of the engine control systems according to the first and second embodiments can be configured to change the stop enabling vehicle-speed VES based on a value of the vehicle speed V measured at a point of time when an acceleration is detected after the complete restart of the engine 10 (at a point of time when the rotational speed of the engine 10 exceeds the predetermined complete-explosion determining threshold and the vehicle speed V has been increased for a preset period of time).

The vehicle speed V can be calculated according to date measured by the crank angle sensor 35.

While there has been described what is at present considered to be the embodiments and their modifications of the present invention, it will be understood that various modifications which are not described yet may be made therein, and it is intended to cover in the appended claims all such modifications as fall within the scope of the invention.

What is claimed is:

1. A vehicle control system that, when a preset stop condition is met during a vehicle being decelerated and an engine being operated, automatically stops the engine, and automatically restarts the engine when a preset restart condition is met before stop of the vehicle and during the engine being stopped, the vehicle control system comprising:

a vehicle speed obtaining unit that obtains a speed of the vehicle;

an enabling speed determining unit that determines a vehicle-speed threshold based on a restart-timing value of the speed of the vehicle, the restart-timing value of the speed of the vehicle being obtained by the vehicle speed obtaining unit when the engine restart condition is met, the vehicle-speed threshold being used to enable a next automatic stop of the engine; and a stop enabling unit that enables the next automatic stop of the engine when the speed of the vehicle obtained after restart of the engine is equal to or higher than the vehicle-speed threshold.

2. The vehicle control system according to claim 1, wherein the enabling speed determining unit determines the vehicle-speed threshold to be higher, by the restart-timing value of the speed of the vehicle, than a value when the engine is restarted with the vehicle being stopped.

3. The vehicle control system according to claim 1, wherein the enabling speed determining unit reduces the vehicle-speed threshold when the vehicle-speed threshold determined based on the restart-timing value of the speed of the vehicle is higher than a reference value and the vehicle is decelerated after restart of the engine, the reference value being a vehicle-speed threshold for restart of the engine during the vehicle being stopped.

4. The vehicle control system according to claim 3, wherein the enabling speed determining unit is configured to reduce the vehicle-speed threshold according to reduction in the speed of the vehicle.

5. The vehicle control system according to claim 3, wherein the enabling speed determining unit is configured to reduce the vehicle-speed threshold up to the reference value as a lower limit.

6. The vehicle control system according to claim 3, wherein the enabling speed determining unit is configured to reduce the vehicle-speed threshold when the speed of the vehicle is lower than the restart-timing value of the speed of the vehicle.

7. The vehicle control system according to claim 3, wherein the enabling speed determining unit is configured to reduce the vehicle-speed threshold at a timing when the speed of the vehicle is reversed from up to down.

8. The vehicle control system according to claim 1, wherein the enabling speed determining unit is configured to set, as the restart-timing value of the speed of the vehicle, a value of the speed of the vehicle, the value of the speed of the vehicle being obtained by the vehicle speed obtaining unit at a timing when the at least one engine restart condition is met, and determine the vehicle-speed threshold based on the restart-timing value of the speed of the vehicle.

* * * * *